United States Patent
Apelqvist et al.

(10) Patent No.: US 11,679,344 B2
(45) Date of Patent: Jun. 20, 2023

(54) AUTOMATIC CLEANING OF LAMELLA PLATE SETTLER

(71) Applicant: NORDIC WATER PRODUCTS AB, Mölndal (SE)

(72) Inventors: Lars Apelqvist, Gothenburg (SE); Daniel Jansson, Skövde (SE)

(73) Assignee: NORDIC WATER PRODUCTS AB, Mölndal (SE)

( * ) Notice: Subject to any disclaimer, the term of this patent is extended or adjusted under 35 U.S.C. 154(b) by 268 days.

(21) Appl. No.: 17/052,566

(22) PCT Filed: May 8, 2019

(86) PCT No.: PCT/SE2019/050410
§ 371 (c)(1),
(2) Date: Nov. 3, 2020

(87) PCT Pub. No.: WO2019/216814
PCT Pub. Date: Nov. 14, 2019

(65) Prior Publication Data
US 2021/0236962 A1  Aug. 5, 2021

(30) Foreign Application Priority Data

May 9, 2018  (SE) .................................. 1850551-1

(51) Int. Cl.
*B01D 21/00* (2006.01)
*B08B 1/00* (2006.01)
(Continued)

(52) U.S. Cl.
CPC ..... *B01D 21/0006* (2013.01); *B01D 21/0045* (2013.01); *B01D 21/30* (2013.01);
(Continued)

(58) Field of Classification Search
None
See application file for complete search history.

(56) References Cited

U.S. PATENT DOCUMENTS 1,458,805 A   6/1923  Christensen
2013/0054022 A1*  2/2013  Jang ..................... A47L 9/2805
                                                    700/245

FOREIGN PATENT DOCUMENTS

CN    207237380 U    4/2018
CN    207545903 U    6/2018
(Continued)

OTHER PUBLICATIONS

English Machine Translation of KR100969933.*
(Continued)

*Primary Examiner* — Nicole Blan
(74) *Attorney, Agent, or Firm* — Global IP Counselors, LLP (57) ABSTRACT

A cleaning system for cleaning a lamella plate settler includes at least one mechanical cleaning device; a suspension device adapted to suspend the mechanical cleaning device; wherein the suspension device includes a displacement device for lowering and raising the at least one mechanical cleaning device for mechanical cleaning of a lamella plate positioned below the cleaning system. By providing a frame supporting the at least one cleaning device; wheels attached to the frame and adapted to move on rails, the wheels including driving wheels and non-driving wheel, and a sensor, preferably an inductive sensor, adapted to sense the rotational position of the driving wheels, the lamella plate settler can be automatically be cleaned without emptying the basin of water, thus allowing cleaning during operation. A lamella plate settler and a method of cleaning a lamella plate are also provided.

19 Claims, 9 Drawing Sheets

(51) Int. Cl.
  *B08B 13/00*    (2006.01)
  *B01D 21/30*    (2006.01)
(52) U.S. Cl.
  CPC .............. *B08B 1/002* (2013.01); *B08B 1/008* (2013.01); *B08B 13/00* (2013.01)

(56) References Cited

FOREIGN PATENT DOCUMENTS

| | | |
|---|---|---|
| CN | 208440340 U | 1/2019 |
| JP | 55-79012 A | 6/1980 |
| KR | 10-0969933 B1 | 7/2010 |
| WO | WO-9524253 A1 * 9/1995 | ......... B01D 21/0003 |
| WO | WO 2016/207459 A1 | 12/2016 |

OTHER PUBLICATIONS

English Machine Translation of WO2016207459.*
International Search Report, issued in PCT/SE2019/050410, dated Jun. 17, 2019.
Written Opinion of the International Searching Authority, issued in PCT/SE2019/050410, dated Jun. 17, 2019.

* cited by examiner

AUTOMATIC CLEANING OF LAMELLA PLATE SETTLER

CROSS-REFERENCE TO RELATED APPLICATION

This application is a U.S. National Stage application of PCT/SE2019/050410, filed May 8, 2019, which claims priority to Swedish Application No. 1850551-1, filed May 9, 2018, the contents of each of which are hereby incorporated by reference.

BACKGROUND

Technical Field

The present disclosure relates generally to lamella plate settlers and more specifically to a system and a method for cleaning a lamella plate settler. A lamella plate settler is also provided.

Background Information

So called lamella plate settlers for water treatment applications are known. The feed in the form of liquid enters the basin through a feed pipe. As the liquid flows upward between inclined parallel plates, wherein solids settle on the inclined plates and slide down the plate. Once the sludge has fallen off the plate it will settle into a sludge hopper at the bottom of a free-standing unit or onto the bottom of the sedimentation basin. In the hopper or on the bottom of the sedimentation basin, the sludge is thickened prior to discharge through a sludge outlet. The clarified liquid leaves the plate assembly through openings at the top and is discharged into collection channels leading to the clarified water outlet.

Even distribution of the flow to each plate ensures optimal operation at a high capacity. The side entry of the fluid prevents the solids that have settled from being carried away with the entering fluid.

A prior art lamella plate settler is disclosed in the international publication No. 02015/167396A1.

SUMMARY

In lamella plate settlers, sludge and fat will accumulate on the plates. This will have a negative effect on the quality of the water leaving the basin.

Therefore, there is a need for cleaning the plates at regular intervals, such as every 3-12 months of operation. Conventionally, this is done by emptying the basin of water and spraying the plates with high pressure water, either by means of a water hose or by means of high pressure water nozzles provided on a frame or the like. However, this cleaning results in an unwanted interruption in the operation of the lamella plate settler.

A device for cleaning a lamella settler is disclosed in the patent publication No. U.S. Pat. No. 1,458,805 A. In this document, a scraper device is disclosed which can be used in to prevent the building up of a cake on the settling surfaces in a settling tank. A set of scrapers can be used or a single scraper can be arranged to pass from one surface to another and to scrape all the settling surfaces successively at suitable intervals.

An object of the present disclosure is to provide a device and a method of cleaning a lamella plate settler which can be used automatically without interrupting the operation of the lamella plate settler.

The disclosure is based on the realization that the lamella plates can be cleaned mechanically and automatically while the lamella plate settler is operating.

Thus, according to a first aspect of the disclosure there is provided a cleaning system for cleaning a lamella plate settler, comprising at least one mechanical cleaning device; suspension means adapted to suspend the mechanical cleaning device; wherein the suspension means comprises displacement means for lowering and raising the at least one mechanical cleaning device for mechanical cleaning of a lamella plate positioned below the cleaning system, which is characterized by a frame supporting the at least one cleaning device; wheels attached to the frame and adapted to move on rails, the wheels comprising driving wheels, and a sensor, preferably an inductive sensor, adapted to sense the rotational position of the driving wheels. In this way, a simple, cost efficient and robust means for automatic cleaning of a lamella plate settler is provided.

In a preferred embodiment, the wheels are adapted to run on rails.

In a preferred embodiment; the driving wheels are designed as cog-wheels adapted to move on rails provided with recesses or cut-outs at regular intervals, preferably intervals corresponding to the mutual distance between two adjacent lamella plates.

In a preferred embodiment, the circumferential distance between two adjacent cogs of the driving wheels corresponds to the mutual distance between two adjacent lamella plates.

In a preferred embodiment, non-driving wheels are provided to run on a planar surface.

In a preferred embodiment, the at least one cleaning device comprises any of the following: a curtain, a cloth and a brush, preferably a tube provided with a brush material on the outside thereof.

In a preferred embodiment, two mechanical cleaning devices are provided, preferably at a mutual longitudinal distance which corresponds to a multiple of the mutual distance between two adjacent lamella plates, and preferably being adapted to be lowered and raised simultaneously.

In a preferred embodiment, the sensor is adapted to sense a number of predetermined rotational positions of the driving wheels corresponding to a number of cogs on the driving wheels, these predetermined positions corresponding to positions of a cleaning operation.

In a preferred embodiment, blocking means are adapted to shut of outlets for clean water from the basin adjacent to the lamella plate positioned below the cleaning system.

In a preferred embodiment, two pairs of transverse wheels are provided which are adapted to move the system in a direction transverse to the direction of the first wheels. Each pair of transverse wheels is preferably mounted on an adjustable mount which is adapted to adjust the level of the transverse wheels between a first, upper position wherein the first wheels engage rails and a second, lower position wherein the first wheels are disengaged from rails.

According to a second aspect of the disclosure, a lamella plate settler is provided comprising a basin and a plurality of rows of lamella plates, the lamella plate settler being characterized by a pair of rails provided with recesses or cut-outs at regular intervals, wherein one rail runs at one side of a row of lamella plates and another rail runs at the opposite side of the row of lamella plates with a mutual distance allowing the wheels of a cleaning system according to the disclosure to run on the rails. Preferably, the rails are provided with a planar surface on which non-driving wheels of the cleaning system can run.

According to a third aspect of the disclosure, a method of cleaning lamella plates of a lamella plate settler by means of a cleaning system according to the disclosure is provided which is characterized by the following steps: a) providing the cleaning system on rails above a lamella plate to be cleaned; b) lowering a mechanical cleaning device of the cleaning system into contact with the lamella plate to be cleaned; c) raising the mechanical cleaning device to a position above the lamella plate; d) displacing the mechanical cleaning device to another lamella plate to be cleaned; and e) repeating steps b)-d) until a last lamella plate is cleaned.

In a preferred embodiment, the method of cleaning lamella plates of a lamella plate settler comprises the additional steps of moving the cleaning system by means of the transverse wheels from rails of a first row of a lamella plates to a second row of lamella plates and then repeating steps b)-d) until a last lamella plate of the second row of lamella plates has been cleaned.

BRIEF DESCRIPTION OF THE DRAWINGS

Embodiments of the invention will be explained in more detail hereinafter with reference to the drawings.

FIGS. 5A and 5B show a perspective view and a side view, respectively, of a third embodiment of a system for cleaning a lamella plate settler, while FIG. 5C shows the cross-sectional shape of rails on which the system runs.

DETAILED DESCRIPTION

Figure 1:
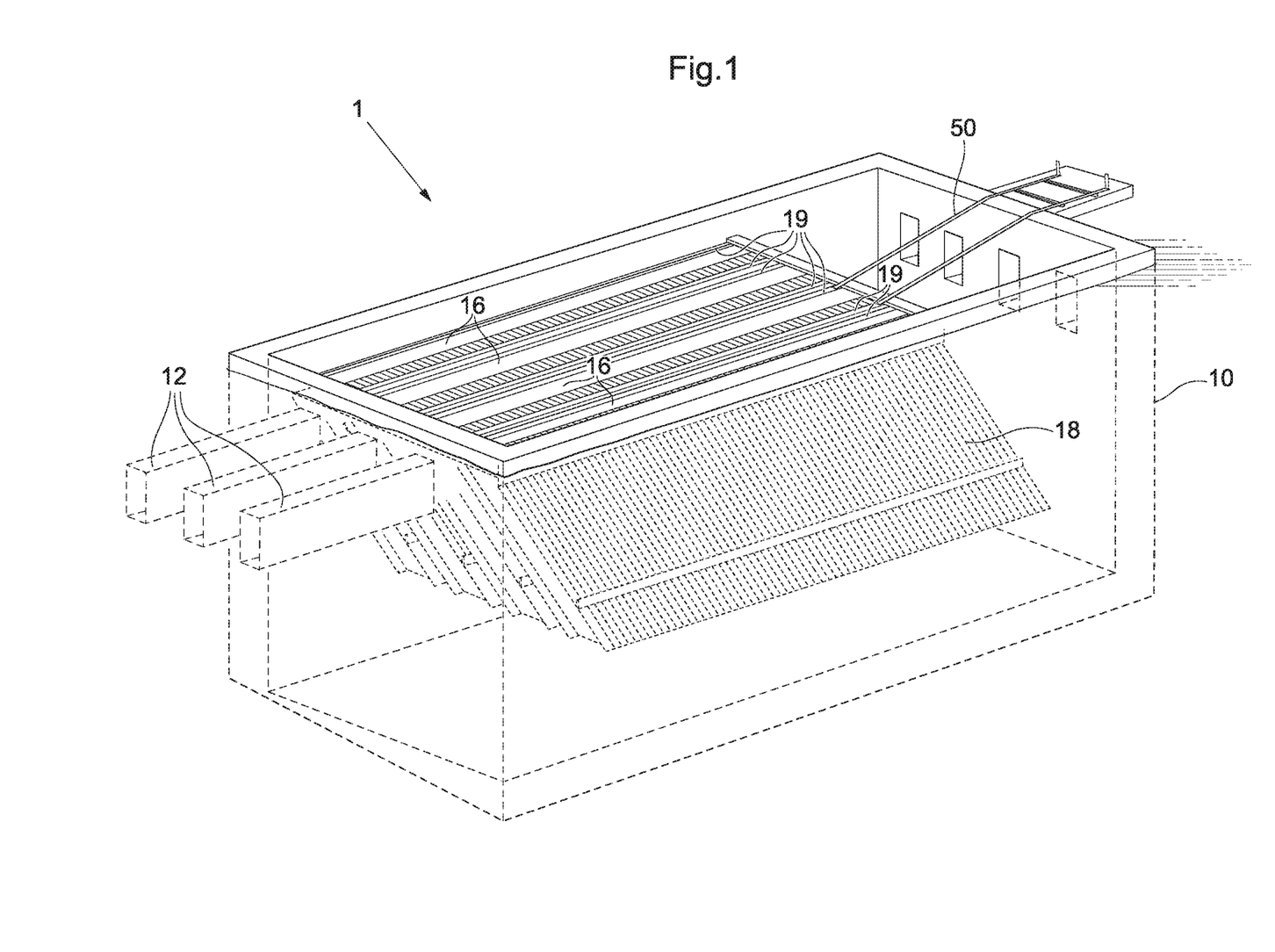
FIG. 1 is a perspective view of a lamella plate settler.

In the following, a detailed description of a lamella plate settler used with a cleaning system and method according to the disclosure will be given with reference to FIG. 1. This figure is a simplified drawing omitting parts, such as inlet and outlet for the fluid.

The lamella plate settler, generally designated 1, comprises a basin 10 which in a preferred embodiment is made of concrete. All or part of the basin 10 can be below the surface of the site, as indicated in the figure. There is an inlet for liquid to be cleaned in the end wall of the basin and a sludge outlet at the bottom of the basin (not shown). In one of the end walls there is a plurality of outlet openings 12 for cleaned liquid.

A support structure in the form of plurality of transverse beams (not shown) can be provided above the fluid contained in the basin 10, i.e., above the basin, or below the lamella. A plurality of outlet flumes 16 extend in the longitudinal direction of the basin 10. The outlet flumes 16 are supported in a suitable way, such as by means of threaded rods extending from beams.

The flumes 16 are mutually parallel and thus form a space there between. Attached between adjacent flumes 16 are inclined lamella plates 18 forming lamella packages. If the lamella plates are made of plastic, adjacent lamella plates are interconnected by means of grooves provided in the edges of the lamella plates. If the lamella plates are made of stainless steel, they are preferably interconnected by means of riveting. These lamella plates, which preferably are made of plastic, are attached to the flumes 16 by means of riveting, for example.

During operation, liquid flows upward between the inclined parallel plates, wherein solids settle on the inclined plates and slide down the plate. Once the sludge has fallen off the plate it will settle into a sludge hopper at the bottom of a free-standing unit or onto the bottom of the sedimentation basin. Since the lamella plates are supported from above, the space below them is free from any obstacles, simplifying removal of the sludge and thus improving the efficiency of the lamella plate settler.

Figure 2:
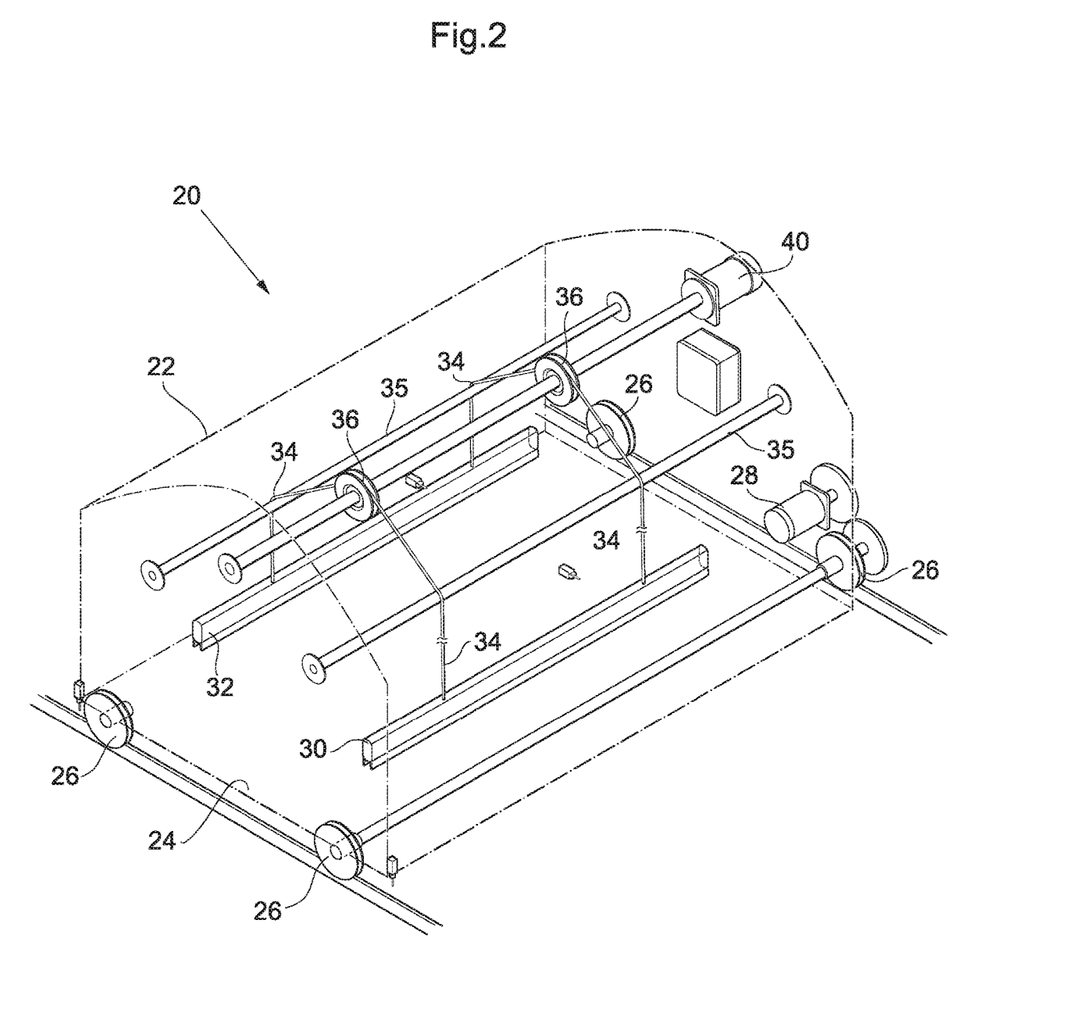
FIG. 2 is a perspective view, partly transparent, of a system for cleaning a lamella plate settler.

An overall view of a cleaning system for the lamella plate settler shown in FIG. 1 will now be described with reference to FIG. 2. The system 20 comprises a housing, generally, designated 22, resting on a frame 24. Two pairs of wheels 26 are attached to the frame 24 and are adapted to run on rails 19, such as U-beams, provided mutually parallel on the top of the lamella plate settler 1 and beside the rows of the lamella plates, including on the longitudinal walls of the basin 10. The wheels of the cleaning system 20 are driven by a motor, preferably an electric motor 28. Preferably, a driving wheel on each side is designed as a cog wheel, as in the embodiment described with reference to FIGS. 5A-C.

The cleaning system 20 further comprises at least one brush and preferably two brushes, in the shown embodiment in the form of a first hollow tube 30 and a second hollow tube 32. These hollow tubes are on the outside provided with some kind of brush material suitable for the cleaning of the lamella plates 18. The hollow tubes 30, 32 are suspended by means of ropes 34, which run over a respective pulley 36 which are provided on a rod 38 provided perpendicularly to the direction of movement of the cleaning system 20. The ropes are guided by suspension rods 35 adapted to suspend the brushes 30, 32 at a predetermined mutual distance. A second servo motor 40 is provided at one end of the rod 38 to rotate the rod and therewith the pulleys in a controlled way.

Figure 3:
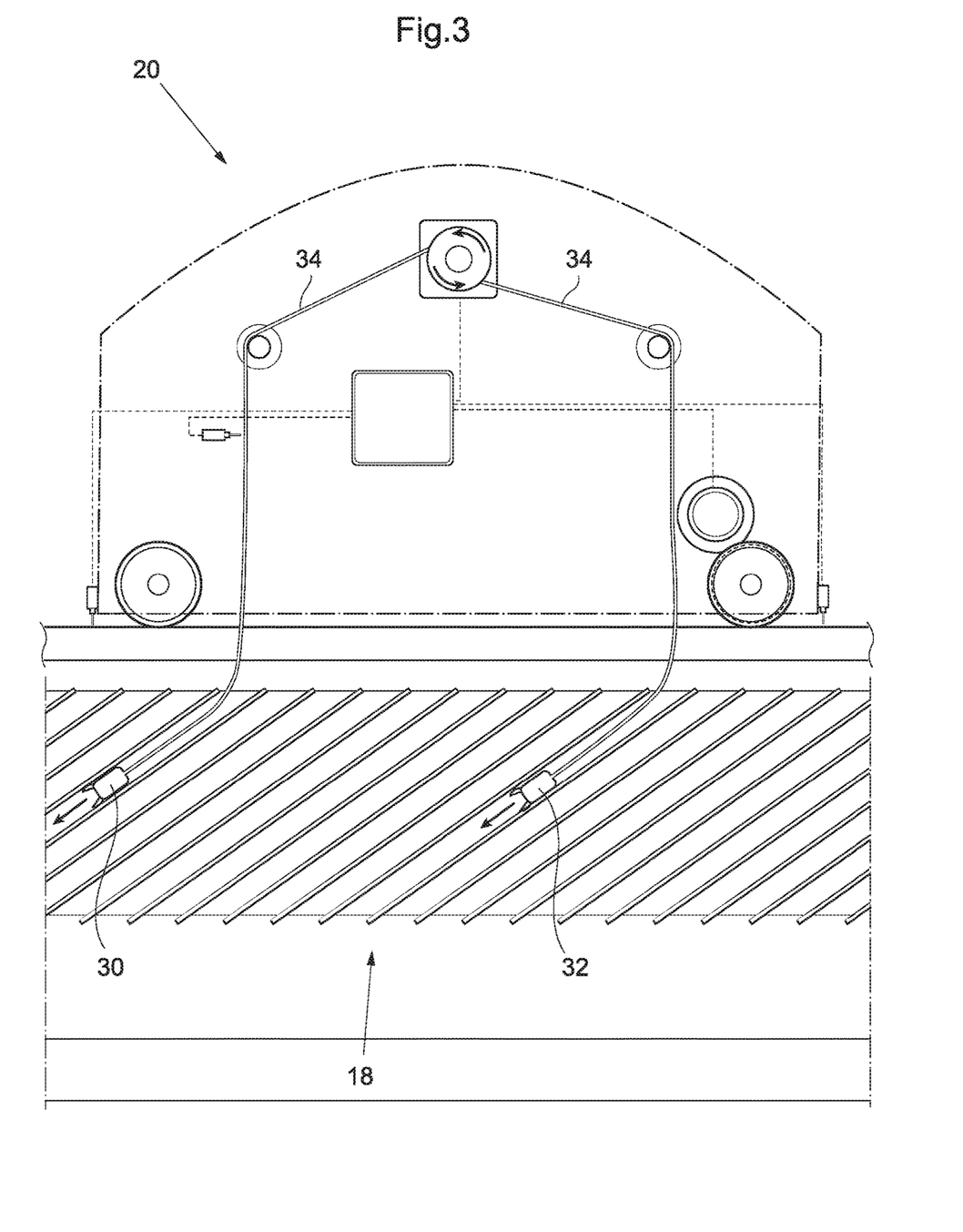
FIG. 3 is a side view of a first embodiment of a system for cleaning a lamella plate settler according to the disclosure.

The operation of the rods 30, 32 will now be described with reference to the side views for a first embodiment and a second embodiment, shown in FIG. 3 and in FIGS. 4A, 4B, respectively. First with reference to FIG. 3, it is shown a lowered position for the brushes 30, 32, when they each is provided in a respective space formed between two adjacent lamella plates 18. From the position shown in FIG. 3, they can be further lowered, as indicated by the arrows, to a position essentially at the lower edge of the lamella plates 18. This lowering is achieved by rotating the pulleys 36, in the shown figure counter-clockwise, synchronously.

When the brushes have reached their lower end positions, the direction of rotation of the pullies 36 is reversed, resulting in a raising of the brushes 30, 32 from their lower end position and to an upper end position (not shown in the figure) above the upper edges of the lamella plates 18. The rope rewinding procedure will continue until the brushes touch a limit switch (not shown) at the housing 22.

During the process of lowering and raising the brushes 30, 32, these will brush against the surfaces of the lamella plates 18, resulting in a mechanical cleaning thereof.

In order to avoid water containing particles stirred up by the cleaning operation from leaving the basin as cleaned water, the two outlet flumes 16 adjacent to the row of lamella plates can be temporarily shut off by means of blocking members (not shown), such as boards, provided on the cleaning system 20. This shutting off can be fully automated.

Figure 4A:
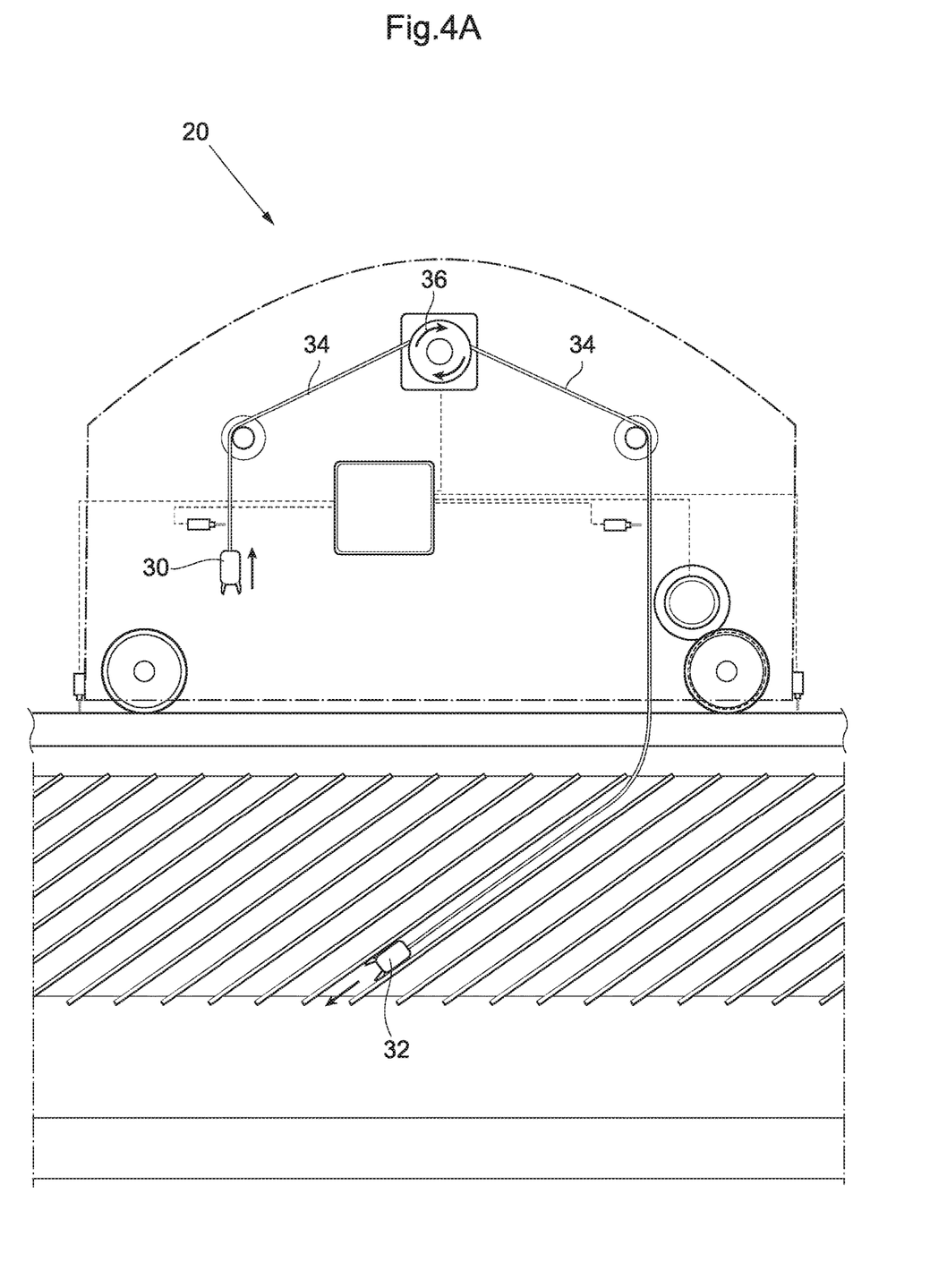
FIGS. 4A and 4B show side view of a second embodiment of a system for cleaning a lamella plate settler.
Figure 4B:
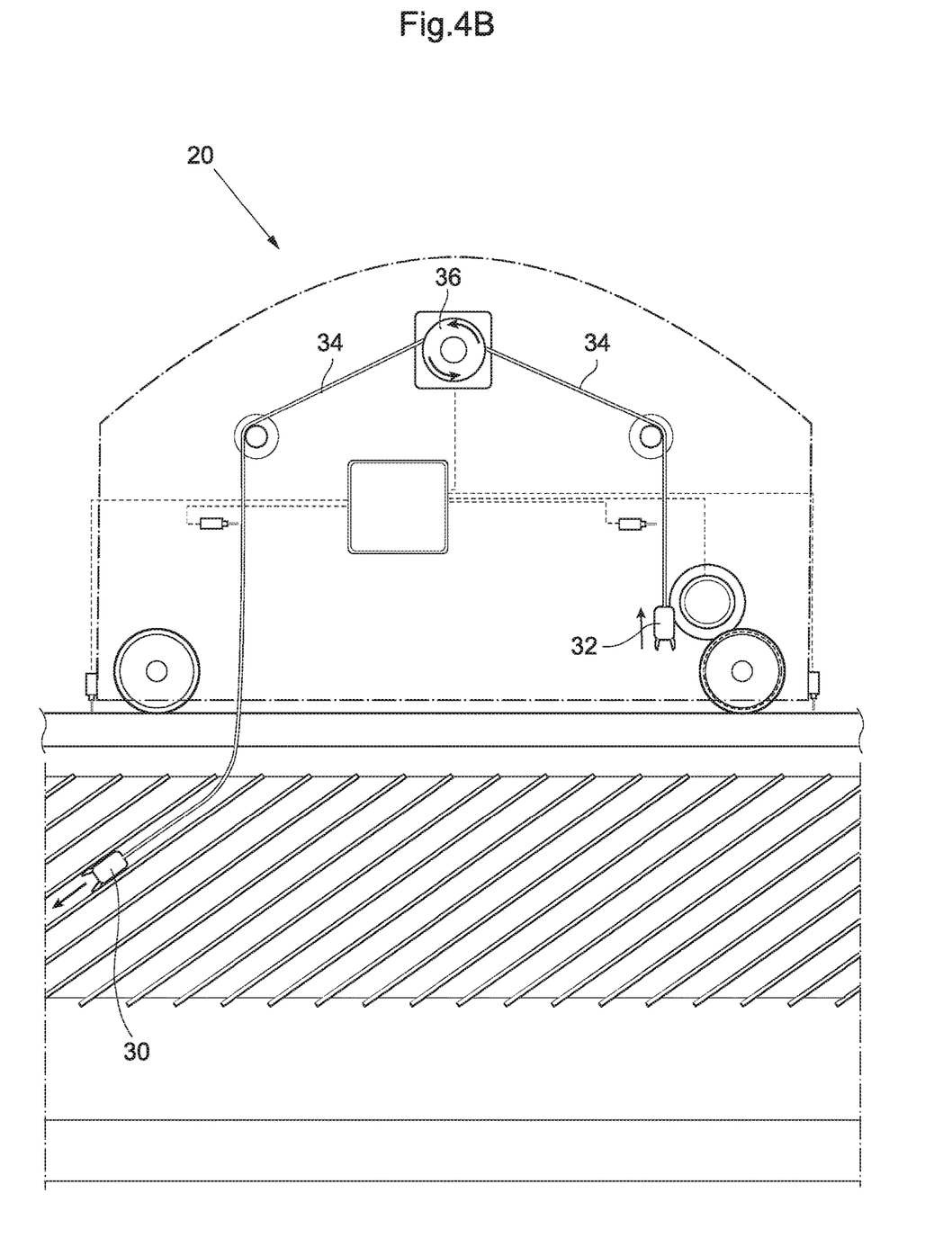

In the second embodiment of a cleaning system shown with reference to FIGS. 4A and 4B, one single rope 34 runs via each pulley 36. This means that when one of the brushes 30 is lowered during rotation of the pulley 36, in FIG. 4A clockwise rotation, the other brush 32 is lowered, By providing a system like this, the pulling force of the two brushes cancel out each other, which means that less power is needed for rotating the rod 38, which in turn means that the second servo motor can have less output power than if operating a single brush. In FIG. 4B, the reverse or counter-clockwise rotation of the pullies 36 is shown, resulting in the lowering of the first brush 30 and the raising of the second brush 32. Preferably, a driving wheel on each side of this second embodiment is designed as a cog wheel, as in the embodiment described with reference to FIGS. 5A and 5B.

Figures 5A, 5B, 5C:
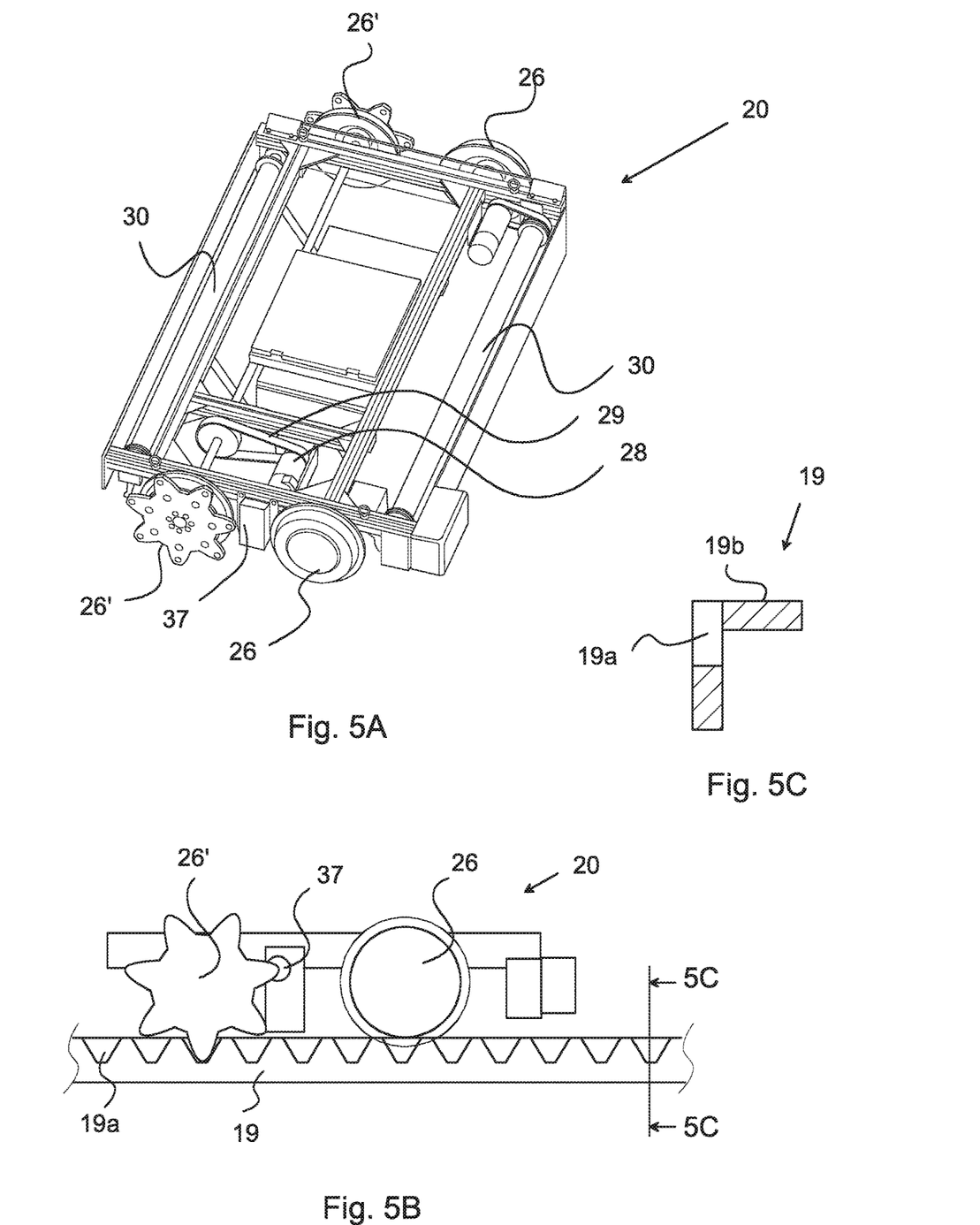

In a third embodiment of a cleaning system shown in FIGS. 5A-C, one of the wheels on either side, namely a driving wheel 26', is shaped like a cog wheel, which is adapted to move on rails 19 provided with recesses or cut-outs 19a at regular intervals. These intervals correspond to the mutual distance between two adjacent lamella plates 18, see FIG. 1. The same distance is found in the circumferential distance between two adjacent cogs 26a' of the driving wheels 26'. As in the other embodiments, at least one mechanical cleaning device, in this embodiment two cleaning devices in the form of curtains 30 are provided at a mutual longitudinal distance which corresponds to a multiple of the mutual distance between two adjacent lamella plates. The driving wheels 26' are driven by a motor 28, either directly or indirectly, such as via a belt 29.

Adjacent to one of the driving wheels 26', a sensor 37, preferably an inductive sensor, is provided, which is connected to a control system adapted to control the turning of the driving wheels 26'. In this way, a simple, cost efficient and robust means is provided for determining the rotational position of the cleaning system 20 in relation to the lamella plates 18. For example, when one of the cogs 26a' of the driving wheels 26' is pointing downward, such as in FIG. 5B, the inductive sensor 37 is aligned with another one of the cogs 26a', which is detected by the sensor 37. This corresponds to a position of the cleaning system 20 on the rails 19 wherein the cleaning devices 30 are positioned above the space between two adjacent lamella plates 18 and is thus a position wherein the cleaning devices can be lowered for a cleaning operation. In other words, in the preferred embodiments the sensor is adapted to sense a number of predetermined rotational positions of the driving wheels 26' corresponding to the number of cogs 26a'. These predetermined positions correspond to positions of a cleaning operation.

In order to allow also the other wheels 26 to move on the rails 19, these have an upside-down L shape, see the cross-sectional view of FIG. 5C. This means that the rails also have a planar surface 19b on which the conventional rail wheels 26 can run.

Alternatively or additionally, a sensor is provided for detecting the recesses or cutouts in the rails which are provided at regular intervals, preferably intervals corresponding to the mutual distance between two adjacent lamella plates.

The operation cycle of the system for cleaning a lamella plate settler will now be described with reference to FIGS. 6A-C. First the cleaning system is loaded on to the basin 10. This is achieved by first positioning a movable slope 50 against one of the side edges of the basin 10, see FIG. 1. This slope can comprise two rails for guiding the cleaning system 20 or simply a planar surface. The system 20 is in itself not very heavy; two persons can carry or lift the system. The slope is aligned with the row of lamella plates 18 to be cleaned and so that the cleanings system 20 can be guided onto two adjacent rails 19.

The cleaning system is then moved to a starting point. In a preferred embodiment, this is achieved by means of sensors, such as a limit switch which is mounted on the housing 23 and corresponding features on the rails 19, so that the cleaning system automatically can sense when this position has been reached.

Figure 6A:
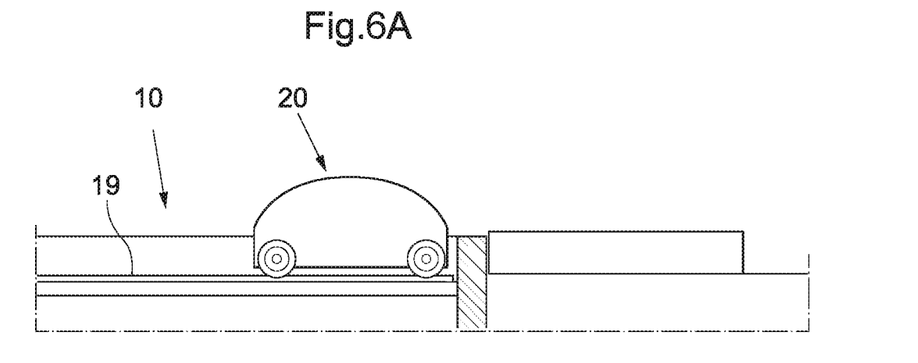
FIGS. 6A-C show schematic side views of different operation stages for a system for cleaning a lamella plate settler.

After the cleaning system has moved to its starting position, such as the one shown in FIG. 6A, the cleaning operation can start. The cleaning system will move forward upon pressing "Start Button" on an operation terminal or corresponding action.

When the inductive sensor 29 of the cleaning system 20 detects that the system is in a position for a cleaning operation, such as the position shown in FIG. 5B, the Control System of the cleaning system 20 will send a signal to the drive motor 28 to stop. The cleaning operation described above with reference to FIGS. 3 and 4a, 4b, also applicable to the third embodiment, then commences. The brushes or curtains will be slowly submerged into the tank and moved along the lamella plates 18.

Once a cycle of cleaning of a lamella plate is completed the cleaning system 20 will move forward until it reaches the next cleaning position. In the example described with reference to FIGS. 5A-C, this means that the driving wheels have turned another 117th of a full turn. This cleaning operation is performed for seven times, after which in this example 14 lamella plates have been cleaned. Continuing the example with a mutual distance between the two cleaning devices of seven lamella plates, during the first cleaning operation cleans lamella plates 1 and 8, the second cleaning operation cleans lamella plates 2 and 9 etc, until lamella plates 7 and 14 have been cleaned. The cleaning system 20 is then moved forward a distance corresponding to seven lamella plates, since these lamella plates have already been cleaned by the forward cleaning device. In the present example, the next cycle starts with the cleaning of lamella plates 15 and 22. The repeated cleaning operation is then recommenced for another seven times etc.

If, during this forward movement of seven lamella plates, the cleaning system reaches an end position, a special operations starts, since there are one or more lamella plates left uncleaned at the end of the basin. This special operation means that the cleaning device 20 moves backward a distance corresponding to a single mutual distance between two adjacent lamella plates 18, and a cleaning operation is performed after each such move.

This special operation is repeated until all remaining lamella plates have been cleaned and the cleaning system 20 will move back to the starting position.

It will be appreciated that a similar control scheme can be applied if the cleaning system comprises a single cleaning device 30. In that case, the cleaning system is programmed to move a distance between each cleaning corresponding to a single distance between adjacent lamella plates.

In summary, the cleaning of the lamella plate settler comprises a) providing a mechanical cleaning device above a lamella plate to be cleaned; b) lowering the mechanical cleaning device with the mechanical cleaning device in contact with the lamella plate to be cleaned; c) raising the mechanical cleaning device to a position above the lamella plate; d) displacing the mechanical cleaning device to another lamella plate to be cleaned; and repeating steps b)-d) until a last lamella plate to be cleaned.

Figure 6B:
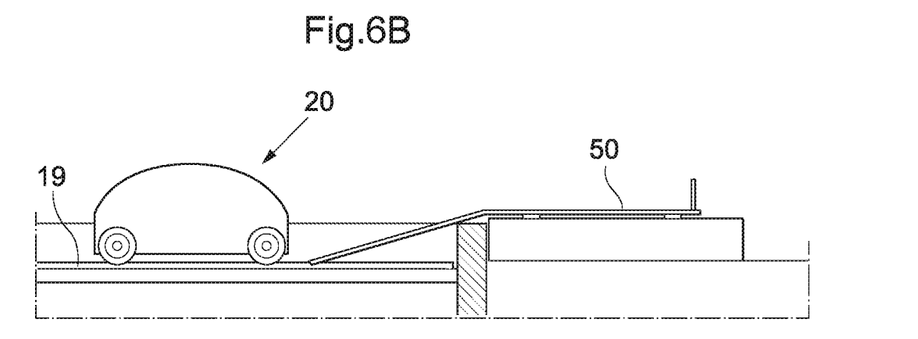

Upon arriving at the starting position, the operator can press a "Finish button" and the cleaning system will move out and give a space to put down the movable ramp, see FIG. 6B. When the movable ramp is in place, an "End Process" button will be pressed and the cleaning system will automatically move backward along the ramp until the Limit Switch/Stop Sensor touches the end of the ramp, see FIG. 6C.

Figure 6C:
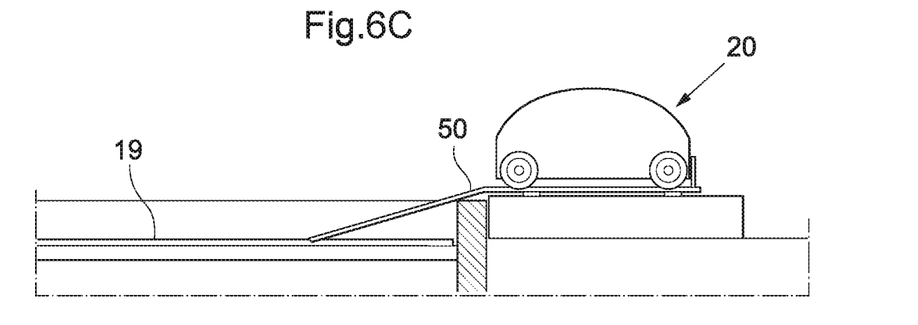

After that the cleaning system 20 has run up the slope and to the position shown in FIG. 6C, the movable slope 50 will be taken away.

Figure 7:
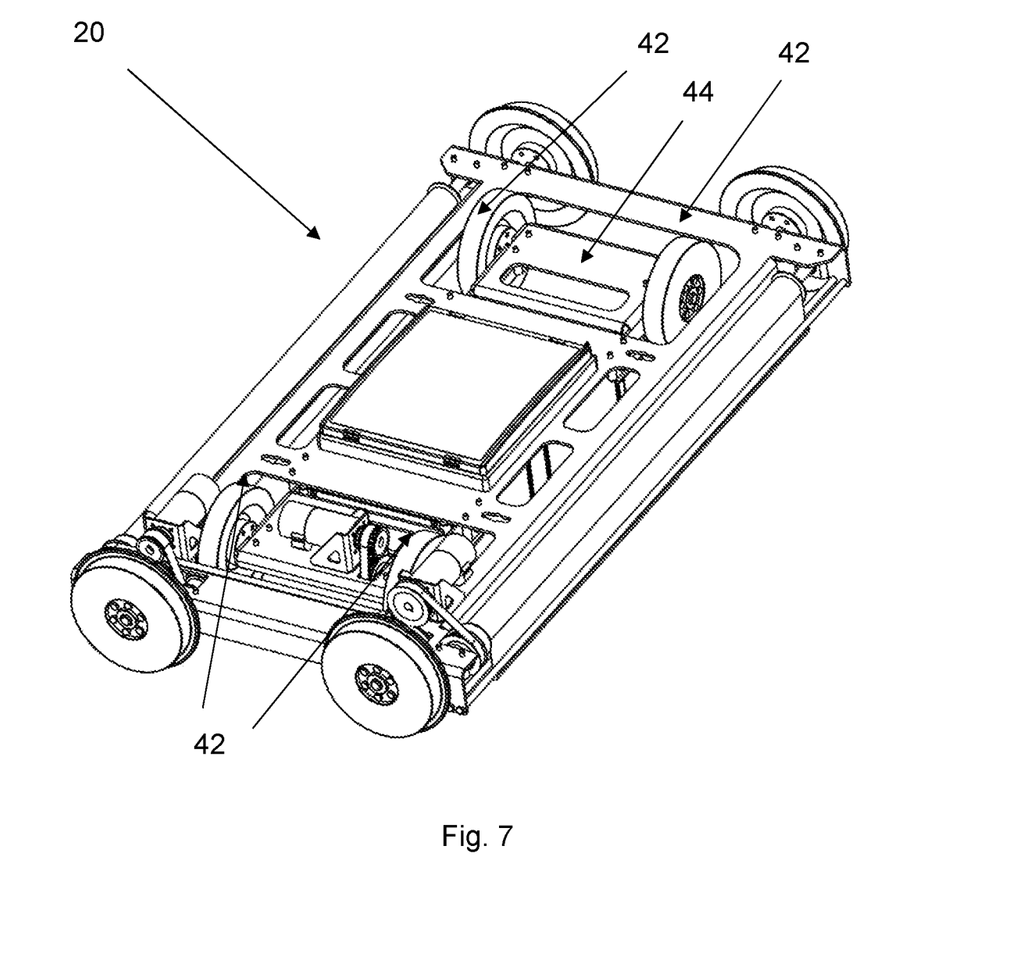
FIG. 7 is a perspective view of a fourth embodiment of a system for cleaning a lamella plate settler.

A fourth embodiment of a cleaning system for the lamella plate settler shown in FIG. 1 will now be described with reference to FIGS. 7 and 8A, 8B. The system 20 is similar to the one shown in FIG. 5A but with the addition of transverse wheels 42, preferably two pairs thereof, which are adapted to move the system in a direction transverse to the direction of the other basic wheels 26, 26'. Each pair of transverse wheels is mounted on an adjustable mount 44 which is adapted to adjust the level of the transverse wheels between a first, upper position shown in FIG. 7, wherein the first wheels 26, 26' engage rails and FIG. 8A, and a second, lower position shown in FIG. 8B, wherein the first wheels are disengaged from rails.

Figure 8A:
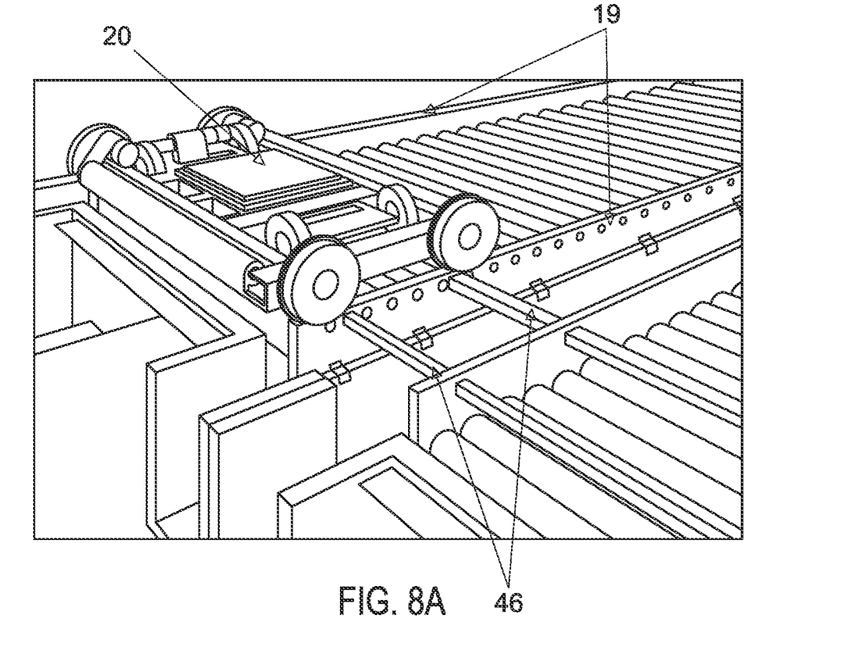
FIGS. 8A and 8B show the system of FIG. 7 during operation in two different positions on rails on which the system runs.

In the embodiment of FIG. 8A, the driving wheels are circular and preferably provided with a sensor (not shown) sensing the rotation of the driving wheels. Alternatively or additionally, a sensor is provided for detecting the recesses or cutouts in the rails which are provided at regular intervals, preferably intervals corresponding to the mutual distance between two adjacent lamella plates.

Figure 8B:
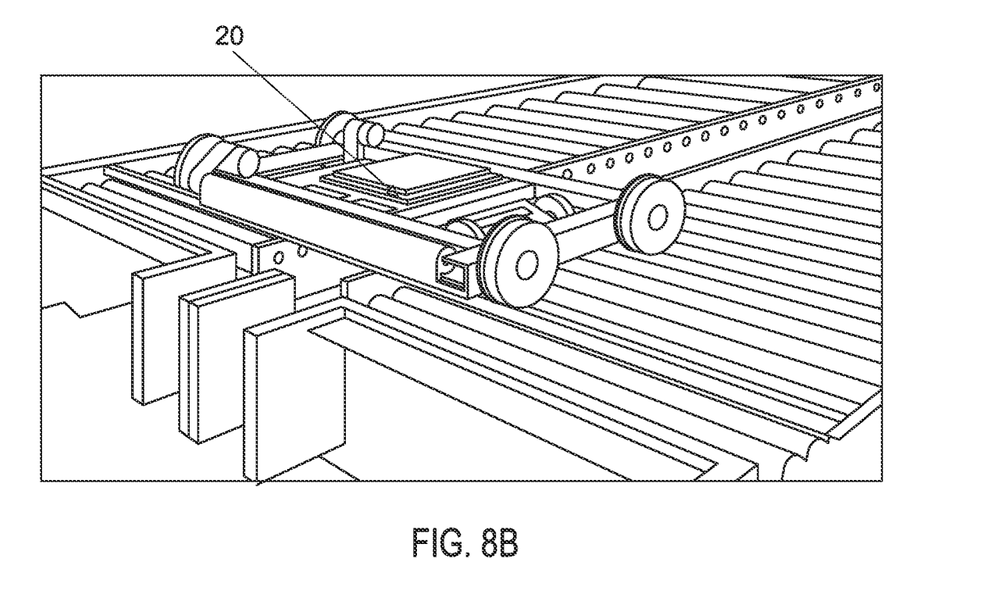

Turning now to FIGS. 8A and 8B, the function of the transverse wheels 42 will be explained. In addition to the longitudinal rails 19, transverse rails 46 extend in a direction transverse to the longitudinal rails 19 between adjacent rows of lamella plates. These transverse rails 46 are preferably provided at one end of the longitudinal rails 19, i.e. where the system for cleaning lamella plates has its start and end position, cf. FIG. 6A.

The operation of the fourth embodiment will now be described. When the system 20 is in the end position shown in FIG. 8A, this is detected by means of sensors (not shown). The transverse wheels re then lowered to the level shown in FIG. 8B, which means that the basic wheels 26, 26' are lifted from the longitudinal rails 19. By means of the transverse wheels 42, the system 20 is moved from one pair of longitudinal rails 19, see FIG. 8A, to an adjacent pair of longitudinal rails, see FIG. 8B while the transverse wheels 42 run on the transverse rails 46. In FIG. 8B, the system 20 has been moved half way between adjacent pairs of longitudinal rails by means of the transverse wheels 42.

When the system 20 has reached the adjacent pair of longitudinal rails, the transverse wheels 42 are adjusted to their upper positions, lowering the wheels 26, 26' onto the adjacent pair of longitudinal rails. A cleaning operation as described above of the adjacent row of lamella plates can then commence.

This means that two or more rows of lamella plates can be automatically cleaned without interruption or operation by operators.

Preferred embodiments of a system for cleaning a lamella plate settler according to the disclosure have been described. It will be realized that these can be varied within the scope of the appended claims without departing from the inventive idea. Also, instead of providing fixed rails on the basin, removable rails can be provided, which are positioned on desired positions on the basin in order to allow movement of the system thereon.

A purely mechanical cleaning system has been described. It will be realized that this can be supplemented with spray nozzles to enable spray cleaning of the lamella plates as well.

The cleanings devices have been shown as brushes. It will be realized that these cleaning devices can take any form suitable for mechanical cleaning of the lamella plates, such as cloths or curtains, such as in the third embodiment.

The term "rope" has been used to describe part of the suspension of the brushes. It will be realized that this term also encompasses other elongated, flexible means, such as wires and chains.

In the shown embodiments, there are two brushes. It will be realized that also a single brush can be provided, simplifying the system but making cleaning of a plurality of lamella plates slower.

Also, each brush is suspended by means of two ropes. It will be realized that a single rope is needed, but this will require guiding of the brush.

In the embodiments, both driving and non-driving wheels are provided. It will be appreciated that the non-driving wheels could be replaced by driving wheels to improve performance. Alternatively, also the non-driving wheels are designed as cog wheels.

The invention claimed is:

1. A cleaning system for cleaning a lamella plate settler, comprising
  at least one mechanical cleaning device;
  a suspension adapted to suspend the at least one mechanical cleaning device, wherein the suspension comprises a displacement device to lower and raise the at least one mechanical cleaning device for mechanical cleaning of a lamella plate positioned below the cleaning system;
  a frame supporting the at least one mechanical cleaning device
  wheels attached to the frame and adapted to move on rails, the wheels comprising driving wheels; and
  a sensor adapted to sense the rotational position of the driving wheels,
  wherein the sensor is connected to a control system, the control system being adapted to control: the turning of the driving wheels, the movement of the cleaning system between different cleaning positions and the initiation of lowering and raising of the at least one mechanical cleaning device.

2. The cleaning system according to claim 1, wherein the wheels are adapted to run on rails.

3. The cleaning system according to claim 2, wherein the driving wheels are designed as cog wheels adapted to move on the rails provided with recesses or cut-outs at regular intervals.

4. The cleaning system according to claim 3, wherein a circumferential distance between two adjacent cogs of the driving wheels corresponds to the mutual distance between two adjacent lamella plates.

5. The cleaning system according to claim 3, comprising non-driving wheels adapted to run on a planar surface of the rails.

6. The cleaning system according to claim 2, wherein the driving wheels are designed as cog wheels adapted to move on the rails provided with recesses or cut-outs at intervals corresponding to the mutual distance between two adjacent lamella plates.

7. The cleaning system according to claim 2, wherein a circumferential distance between two adjacent cogs of the driving wheels corresponds to the mutual distance between two adjacent lamella plates.

8. The cleaning system according to claim 2, comprising non-driving wheels adapted to run on a planar surface of the rails.

9. The cleaning system according to claim 1, comprising non-driving wheels adapted to run on a planar surface of the rails.

10. The cleaning system according to claim 1, wherein the at least one mechanical cleaning device comprises any of the following: a curtain, a cloth and a brush.

11. The cleaning system according claim 1, comprising two mechanical cleaning devices, provided at a mutual longitudinal distance corresponding to a multiple of the mutual distance between two adjacent lamella plates, and being adapted to be lowered and raised simultaneously.

12. The cleaning system according to claim 1, wherein the sensor is adapted to sense a number of predetermined rotational positions of the driving wheels corresponding to a number of cogs on the driving wheels, these predetermined positions corresponding to positions of a cleaning operation.

13. The cleaning system according to claim 1, comprising blocking device adapted to shut outlets for clean water from a basin adjacent to the lamella plate positioned below the cleaning system.

14. The cleaning system according to claim 1, comprising two pairs of transverse wheels adapted to move the cleaning system in a direction transverse to the direction of the driving wheels.

15. The cleaning system according to claim 14, wherein each pair of the two pairs of transverse wheels is mounted on an adjustable mount adapted to adjust the level of the two pairs of the transverse wheels between a first, upper position wherein the driving wheels engage the rails and a second, lower position wherein the driving wheels are disengaged from the rails.

16. The cleaning system according to claim 1, wherein the sensor is an inductive sensor.

17. The cleaning system according to claim 1, wherein the at least one mechanical cleaning device comprises any of the following: a curtain, a cloth and a tube provided with a brush material on the outside thereof.

18. A method of cleaning lamella plates of a lamella plate settler by the cleaning system according to claim 1, comprising:
a) providing the cleaning system on the rails above the lamella plate to be cleaned;
b) lowering the at least one mechanical cleaning device of the cleaning system into contact with the lamella plate to be cleaned;
c) raising the at least one mechanical cleaning device to a position above the lamella plate;
d) displacing the at least one mechanical cleaning device by the cleaning system on the rails by the driving wheels and by the control system adapted to control the turning of the driving wheels, to another lamella plate to be cleaned; and
e) repeating steps b)-d) until a last lamella plate is cleaned.

19. The method of cleaning lamella plates of a lamella plate settler according to claim 18, the cleaning system comprising two pairs of transverse wheels adapted to move the cleaning system in a direction transverse to the direction of the driving wheels, the method further comprising the additional steps of moving the cleaning system by the two pairs of transverse wheels from rails of a first row of a lamella plates to a second row of lamella plates and then repeating steps b)-d) until a last lamella plate of the second row of lamella plates has been cleaned.

* * * * *